United States Patent [19]

Hile

[11] 4,399,862
[45] Aug. 23, 1983

[54] METHOD AND APPARATUS FOR PROVEN DEMAND AIR CONDITIONING CONTROL

[75] Inventor: James R. Hile, Kirkville, N.Y.

[73] Assignee: Carrier Corporation, Syracuse, N.Y.

[21] Appl. No.: 293,056

[22] Filed: Aug. 17, 1981

[51] Int. Cl.³ .................... G05D 23/32; F25B 13/00
[52] U.S. Cl. ........................................ 165/2; 62/158;
                                                236/1 C; 236/49
[58] Field of Search ............... 62/158, 180, 186, 231;
            236/49; 165/27, 12, 2; 236/91 D, 91 F, 1 C

[56] References Cited

U.S. PATENT DOCUMENTS

| | | | |
|---|---|---|---|
| 2,130,327 | 9/1938 | Galson | 62/158 X |
| 2,168,157 | 8/1939 | Crago | 62/158 |
| 4,094,166 | 6/1978 | Jerles | 62/158 |
| 4,237,966 | 12/1980 | Tomlinson | 62/158 X |
| 4,242,876 | 1/1981 | Cooper et al. | |

OTHER PUBLICATIONS

Honeywell Pamphlet-W973 Solid State Energy Management System.

*Primary Examiner*—William E. Wayner
*Attorney, Agent, or Firm*—Donald F. Daley; Robert P. Hayter

[57] ABSTRACT

A method and apparatus for proving a demand for air conditioning or heating upon startup of an air conditioning unit before the unit is allowed to effect heat transfer. A separate thermal sensing unit is provided in the return air to prove a demand for cooling prior to the conventional thermostat of the unit being energized to operate the unit in the normal manner. This method and apparatus prevents energy waste and unnecessary cycling at startup and low load conditions.

10 Claims, 2 Drawing Figures

METHOD AND APPARATUS FOR PROVEN DEMAND AIR CONDITIONING CONTROL

BACKGROUND OF THE INVENTION

1. Field of the Invention

The present invention concerns a control and method of controlling an air conditioning unit. More specifically, the present invention concerns sensing return air temperature and controlling the air conditioning unit upon startup based upon that temperature.

2. Prior Art

A typical air conditioning unit includes a fan for circulating air to an enclosure to be conditioned and a refrigeration circuit including a compressor, condenser, evaporator and expansion device for absorbing heat energy from the air. Additionally, heating means in the form of electric resistance heaters, fuel fired burners or a reversible refrigeration system may be incorporated into the air conditioning unit. Other features such as economizer operation for drawing cooler ambient air into the enclosure may also be provided. The operation of the unit is typically controlled by a temperature sensing element located either in the enclosure or in the discharge air stream from the air conditioning unit. Based upon the temperatures sensed, the unit is operated in the heating or cooling mode such that the enclosure temperature is maintained in the appropriate range.

In a typical commercial application, the air conditioning unit is operated on a weekly schedule such as five days a week in an office building or seven days a week in a store or other application where there is daily use. To save energy, air conditioning is typically operated only during the hours of use and any time period prior to use for conditioning the air to the appropriate temperature range. In a typical store application an air conditioning unit may be energized at 7:00 A.M. to provide the appropriate enclosure conditions by 9:00 A.M. when the store is opened to the public. The air conditioning unit may then be de-energized at 8:00 P.M. with the store allowed to coast until the 9:00 P.M. closing time.

One type of air conditioning system is controlled based on discharge air temperature from the system. Specifically, variable air volume systems are those systems wherein the supply air is ducted to numerous outlets, each of which modulates to vary the volume of air being discharged therefrom in response to the temperature condition of that area. These devices typically include a bladder type device which opens or closes a port allowing a predetermined volume of air to enter that portion of the enclosure. A single temperature sensing element in the enclosure would be ineffective to regulate the air conditioning unit since the total demand is a function of all the individual variable air volume outlets. Hence, in this type application the temperature being sensed is the discharge temperature from the air conditioning unit which is the temperature of the air being supplied to a supply plenum for conducting the air to the various variable air volume outlets.

It has been found that upon the recurrent energization of the air conditioning unit on a daily basis typically done on a seven day time clock, there is very little cooling load when the unit is first initiated. In fact, upon initiation there may be a brief heating need to bring the enclosure up to the desired temperature.

It has additionally been found that upon initiation of the unit in the morning or startup that the temperature sensed in the supply plenum is typically warm although not necessarily indicative of the enclosure requiring cooling. Since this supply plenum temperature is warm the air conditioning unit is operated in the cooling mode until the supply plenum is reduced in temperature. This operation of the unit may be unnecessary and effect cooling of the enclosure below a desired temperature. In use with a variable air volume system this operation may create additional potential problems since the variable air volume outlets will always discharge a minimum amount of conditioned air flow and hence a cool building may be further cooled at startup based on a discharge plenum thermostat.

Additionally, an occasional heating requirement in a commercial building may be found upon startup. Although the unit senses a heating load it is desirable to have the unit operate only in a heating mode for a brief period to raise the temperature of the enclosure and thereafter to switch to a cooling mode for the remainder of the time interval for which it will operate. In the past, with a variable air volume system it has been possible to operate the unit to supply heat energy which raises the discharge plenum temperature to the point where the unit is then operated in the cooling mode. Hence, the air conditioning unit under these circumstances is operated sequentially in heating and cooling wasting energy and providing little net effect to the enclosure.

The present control scheme provides a system wherein upon startup of the unit on a daily or other recurrent basis a fan is first operated. The fan circulates air for a predetermined time interval, said air flowing from the unit through a supply plenum to the enclosure and through a return plenum back to the unit. A temperature sensor is mounted in the return plenum to determine the temperature of the return air.

If the temperature of the return air is sufficiently high the unit will enter the cooling mode and then be operated from the discharge temperature sensor. If the temperature of the return air is insufficient to require cooling then the discharge temperature sensor will be bypassed preventing the unit from operating in the cooling mode until the return air temperature rises to a predetermined temperature level.

If heating is required, the return air sensor will initiate the heating cycle. Once this cycle is complete the thermostat will allow the unit to be operated in the heating mode to satisfy the heating load. Should the return air sensor detect a temperature sufficiently high enough to indicate that cooling is required the heating mode of operation of the air conditioning unit will be locked out for the remainder of that time interval. Hence, the method and apparatus described herein act to prevent needless, redundant or energy wasteful operation of the air conditioning unit during startup at the beginning of each time interval.

SUMMARY OF THE INVENTION

It is an object of the present invention to provide an improved air conditioning control.

It is a further object of the present invention to provide an improved method of operating an air conditioning unit.

It is a further object of the present invention to provide a method of saving energy when operating an air conditioning unit by preventing the air conditioning unit from operating in unwarranted heating or cooling cycles during startup.

It is a further object of the present invention to provide a means for proving a demand for cooling prior to the air conditioning unit being allowed to operate in the cooling mode.

It is a further object of the present invention to provide a method of operating an air conditioning unit wherein once the unit has switched to the cooling mode of operation heating is locked out for the remainder of that time interval.

It is a further object of the present invention to provide a safe, efficient and reliable method of controlling an air conditioning unit.

Further objects will be apparent from the description to follow and the appended claims.

The above objects are achieved according to the preferred embodiment of the invention which includes an air conditioning unit having apparatus for proving a need prior to the unit being energized. The air conditioning unit includes a refrigeration circuit for removing heat energy from the air and a fan for circulating air between the air conditioning unit and the enclosure. Initiation means, such as a clock, are provided for recurrently starting the air conditioning unit for a time interval during which the air conditioning unit will act to maintain the temperature of the enclosure. A first thermostat means for sensing the temperature of the air being discharged from the air conditioning unit and second thermostat means for sensing the temperature of the air from the enclosure being circulated to the air conditioning unit are also part of the system. The first thermostat means is connected to energize a compressor motor of the refrigeration circuit for energizing the refrigeration circuit when a cooling need is sensed by the first thermostat means. Lockout means including first normally open delay relay contacts are connected to at least one of the circuit means, first thermostat means or the compressor motor of the refrigeration circuit, said lockout means including switching means connected to the second thermostat means for maintaining the first normally open delay relay contacts open to prevent operation of the refrigeration circuit until the temperature sensed by the second thermostat means exceeds a predetermined threshhold level upon startup of the unit.

The method as claimed herein provides for controlling an air conditioning unit which is recurrently energized to condition an enclosure for a time interval, said air conditioning unit including a fan for circulating air through the enclosure to the air conditioning unit and a refrigeration circuit for removing heat energy from the air to the enclosure. The method for controlling includes the steps of energizing the fan to circulate air from the enclosure to the air conditioning unit, sensing the temperature of the air being circulated through the air conditioning unit and detecting the temperature of air after it has been circulated in heat exchange relationship with the refrigeration circuit. The refrigeration circuit is energized upon the appropriate temperature being ascertained by the step of detecting the temperature and further including the step of preventing the step of energizing the refrigeration circuit until the temperature ascertained by the step of sensing exceeds a predetermined threshhold level upon startup of the air conditioning unit at the beginning of the time interval.

DETAILED DESCRIPTION OF THE PREFERRED EMBODIMENT

The preferred embodiment described herein will refer to a rooftop type air conditioning system for use with a variable air volume supply system to direct air to an enclosure. It is to be understood that this control method has applicability to other types of air conditioning units and to other distribution systems. It is further to be understood that although the temperature sensors as set forth herein are described as being in the return plenum and discharge plenum the temperature sensing elements may be located within the air conditioning unit itself within the appropriate air flow paths.

Figure 1:
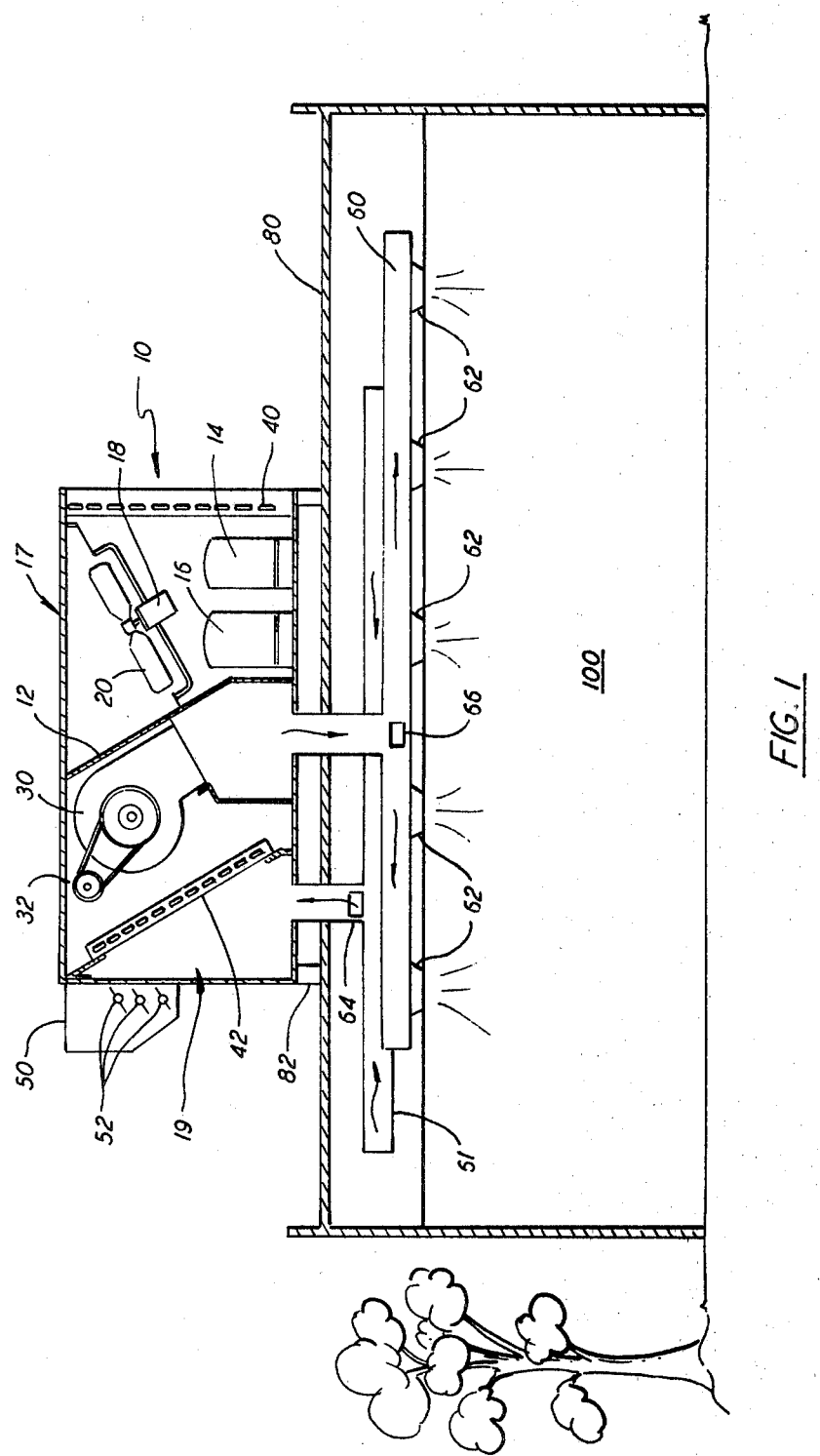
FIG. 1 is a schematic view of a rooftop type air conditioning unit mounted to an enclosure.

Referring now to FIG. 1 there can be seen a rooftop air conditioning unit 10 mounted via roof curb 82 to roof 80 of enclosure 100. Air conditioning unit 10 includes indoor heat exchanger 42 and outdoor heat exchanger 40. Compressors 14 and 16 and condenser fan 20 powered by condenser fan motor 18 are all shown located in outdoor section 17 of the air conditioning unit. Indoor section 19 of the air conditioning unit has located therein indoor heat exchanger 42, fan motor 32 and supply fan 30. Economizer 50 is mounted to unit 10 and includes dampers 50 which allow ambient air to enter the indoor section of the air conditioning unit.

Under normal operating conditions, heat energy is transferred between outdoor ambient air being circulated through the outdoor heat exchanger 40 by condenser fan 20 and the indoor heat exchanger 42 having the enclosure air circulated therethrough by supply fan 30. Outdoor ambient air may also be drawn into the unit via economizer 50.

Supply plenum 60 is connected to the air conditioning unit to receive the indoor air being discharged by supply fan 30. Discharge plenum thermostat 66 is located to sense the temperature of the air being discharged from the air conditioning unit. Return plenum 61 is shown connected to direct air from the enclosure to the supply fan of the indoor section of the heat exchange unit. Return plenum thermostat 64 is mounted in the return air flow stream to sense the temperature of the return air. Enclosure 100 is labeled to define the space to be conditioned which may be a commercial building, store or office building or the like.

Figure 2:
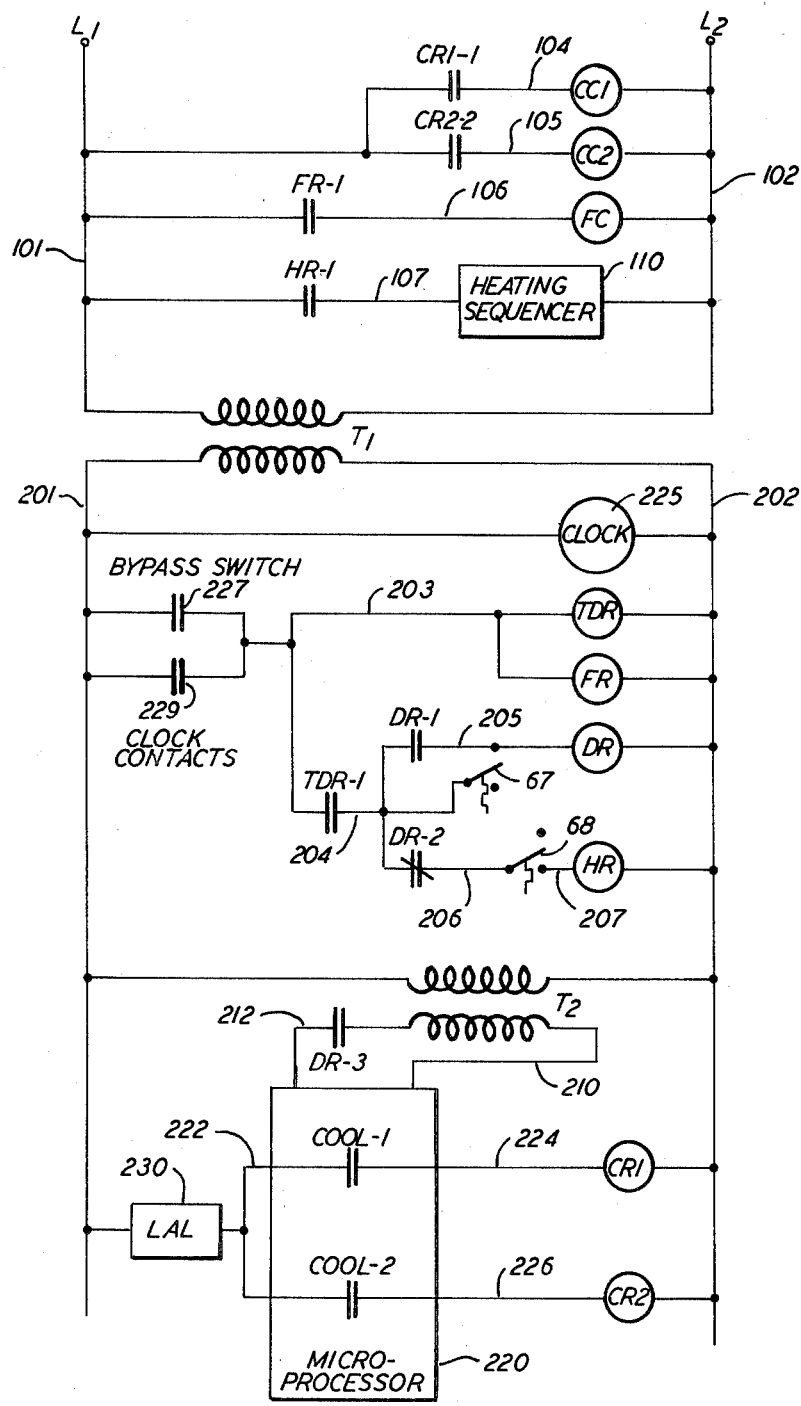
FIG. 2 is a schematic view of a wiring schematic for controlling an air conditioning unit.

Referring now to FIG. 2 there can be seen a partial schematic of a wiring diagram for an air conditioning unit. Therein it can be seen that power is supplied through lines L-1 and L-2 to a power portion of the circuit. Wires 101 and 102 are shown connecting the various components. L-1 is connected to wire 101 which is connected to compressor relay contacts CR1-1, compressor relay contacts CR2-2, fan relay contacts FR-1, heating relay contacts HR-1 and one winding of transformer T-1. Wire 102 is connected to compressor contactor CC-1, compressor contactor CC-2, fan contactor FC and to heating sequencer 110 and one winding of transformer T-1. Wire 104 connects compressor relay contacts CR1-1 to compressor contactor CC-1. Wire 105 connects compressor relay contacts CR2-2 to compressor contacts CC-2. Wire 106 connects fan relay contacts FR-1 to fan contactor FC. Wire 107 connects heating relay contacts HR-1 to heating sequencer 110.

In the controls portion of the wiring diagram it can be seen that connected to the reduced voltage winding of transformer T-1 are wires 201 and 202. Wire 201 is additionally connected to clock 225, bypass switch 227, clock contacts 229, transformer T-2 and to low ambient level lockout 230. Wire 202 is shown connected to clock 225, time delay relay TDR, fan relay FR, delay relay DR, heating relay HR, transformer T-2, compressor relay CR-1 and compressor relay CR-2. Wire 203 connects bypass switch 227 and clock contacts 229 with time delay relay TDR, fan relay FR and time delay contacts TDR-1. Wire 204 connects normally open time delay contacts TDR-1 normally open delay relay contacts DR-1 with temperature sensing element 67 and normally closed delay relay contacts DR-2. Wire 205 connects normally open delay relay contacts DR-1 with the delay DR and temperature sensing element 67. Wire 206 connects normally closed delay relay contacts DR-2 with temperature sensing element 68. Wire 207 connects temperature sensing element 68 with heating relay HR.

Wire 212 connects microprocessor 220 to a winding of transformer T-2 through normally open delay relay contacts DR-3. Wire 210 completes the circuit between transformer T-2 and microprocessor 220. Wire 222 connects the low ambient limit lockout 230 with switch Cool 1 and switch Cool 2, each a part of the microprocessor control. Wire 224 connects switch Cool 1 with compressor relay CR-1 and wire 226 connects switch Cool 2 with compressor relay CR-2.

Microprocessor 220 is connected (not shown) to discharge plenum thermostat 66 such that switches Cool-1 and Cool-2 are controlled based on the discharge temperature sensed by discharge plenum thermostat 66.

Numerous other details of the wiring schematic for this type of air conditioning unit have been omitted for the sake of clarity. Although the compressor contactors CC-1 and CC-2 and fan contactor FC and the heating sequencer have been shown in the power portion of FIG. 2, the specific motors and heating elements have not been shown. A typical wire schematic would include the compressor contactors CC-1 and CC-2 energizing the three legs of a polyphase motor through various relays. The fan contactor would energize the fan motor in a similar manner. The heating sequencer would typically provide a series of resistance heating elements which would be energized after various time delays to provide heating input to the indoor air flowing thereover. The microprocessor as described above is a commercially available microprocessor control sold to the air conditioning industry by Honeywell, Inc. of Minneapolis, Minnesota.

OPERATION

A clock 225 is conventionally utilized to recurrently energize an air conditioning system on a planned schedule such as daily for a time interval from 7:00 A.M. to 9:00 P.M. The clock will call for energization of the air conditioning unit when the morning time is reached. Clock 225 at that time energizes clock contacts 229 supplying energy to the time delay relay TDR and fan relay FR. The fan relay energizes, through fan relay contacts FR-1, wire 106 and fan contactor FC, the fan motor driving supply fan 30. Air is then circulated through the supply plenum 60 to the enclosure and from the enclosure through return plenum 61 to the indoor section 19 of the air conditioning unit. After a predetermined time interval has elapsed time delay relay TDR closes time delay relay contacts TDR-1 thereby supplying power to normally open delay relay contacts DR-1, to sensing element 67 and to sensing element 68 through normally closed delay relay contacts DR-2. Sensing elements 67 and 68 correspond to the return plenum thermostat 64 shown in FIG. 1. When the temperature being sensed by temperature sensing elements 67 and 68 indicates a need for heating, temperature sensing element 68 will close energizing through wire 207 heating relay HR. Heating relay HR will close normally open heating relay contacts HR-1 which energizes through wire 107 heating sequencer 110 bringing on electric resistance heat. Once the heating load is satisfied temperature sensing element 68 opens de-energizing through heating relay HR the electric resistance elements. The temperature sensing element 68 will cycle bringing on the heating element through the heating relay until a cooling need is ascertained.

In the heating mode a variable air volume unit may be operated similarly to a constant volume unit. The individual discharge terminals may be connected to be opened wide allowing for maximum heated air flow from the terminals in the heating mode.

Should temperature element 67 indicate a sufficiently high temperature to prove there is a cooling need, temperature element 67 will close energizing through wire 205 delay relay DR. Temperature element 67 may close after an interval during which the fan is operated and without the unit having operated in the heating mode previously. Once temperature element 67 closes delay relay DR is energized which acts to de-energize or open normally closed delay relay contacts DR-2 thereby preventing heating operation through the heating relay and acts to close normally open delay relay contacts DR-1 which acts to lock in the delay relay. Hence, once temperature sensing element 67 has been closed energizing the delay relay the delay relay remains constantly energized thereafter until the unit is de-energized at the end of the daily time period.

Once delay relay DR is energized the unit operates in the conventional mode of operation and the startup control period is terminated. Normally open delay relay contacts DR-3 are closed energizing microprocessor 220 through wires 210, 212 and transformer T-2. Thereafter sequencing of the air conditioning unit in the cooling operation is controlled by microprocessor switches Cool 1 and Cool 2 which sequentially energize compressor relays CR-1 and CR-2 which act to close compressor relay contacts CR1-1 energizing compressor contactor 1 through wire 104 and compressor relay contacts CR2-2 energizing through wire 105 compressor contactor 2. The compressor contactors act to energize the compressor motors bringing the refrigeration circuits into operation to effect heat transfer from the indoor air. Low ambient lockout switch 230 is used to deactivate the compressor operation if the outdoor ambient temperature drops to a point where operation may affect icing or potential damage to the air conditioning circuits.

The described circuit and operating method herein allow for a startup period during which operation of the air conditioning unit is controlled by return plenum temperatures regardless of the discharge temperatures. During this time interval heating may be accomplished separate from the discharge air temperature and a period may be allowed in which air is circulated until there is a proven demand. Once the demand is proven the unit is operated in the cooling mode as if it were under normal discharge temperature control.

The apparatus and method has been described herein with reference to a preferred embodiment. It is to be understood that variations and modifications can be effected in both the apparatus and the method within the spirit and scope of the invention.

What is claimed is:

1. A method of controlling an air conditioning unit which is recurrently energized to condition an enclosure for a time interval, said air conditioning unit including a fan for circulating air through the enclosure to the air conditioning unit and a refrigeration circuit for removing heat energy from the air of the enclosure which comprises the steps of:

energizing the fan to circulate air from the enclosure to the air conditioning unit;

sensing the temperature of the air being circulated to the air conditioning unit;

detecting the temperature of the air after it has been circulated in heat exchange relationship with the refrigeration circuit;

energizing the refrigeration circuit upon an appropriate temperature being ascertained by the step of detecting; and preventing the step of energizing until the temperature ascertained by the step of sensing exceeds a predetermined threshhold temperature upon startup of the air conditioning unit at the beginning of a time interval.

2. The method as set forth in claim 1 wherein the air conditioning unit has a return air duct for conducting air from the enclosure to the unit and wherein the step of sensing includes sensing the temperature of air flowing through the return air duct.

3. The method as set forth in claim 1 wherein the air conditioning unit includes a heating means for increasing the temperature of the air being supplied to the enclosure and further comprising the step of:

energizing the heating means if the step of sensing ascertains a heating need upon startup of the air conditioning unit at the beginning of a time interval; and locking out the step of energizing the heating means when the step of sensing ascertains the temperature of the air being circulated through the air conditioning unit exceeds a predetermined temperature level.

4. The method as set forth in claim 1 wherein the air conditioning unit includes a thermostat means and the refrigeration circuit includes a compressor and wherein the step of preventing the step of energizing further comprises maintaining normally open contacts connecting the thermostat means to a power source open until the threshhold temperature is exceeded.

5. Apparatus for proving a need for cooling before allowing an air conditioning unit refrigeration circuit to be energized upon startup of an air conditioning unit which comprises:

initiation means for energizing the air conditioning unit for a time interval during which the air temperature of the enclosure is controlled by the air conditioning unit;

a fan for circulating air between the enclosure to be conditioned and the air conditioning unit;

first thermostat means for sensing the temperature of the air being circulated from the air conditioning unit to the enclosure;

second thermostat means for sensing the temperature of the air from the enclosure being circulated to the air conditioning unit;

circuit means connected to the first thermostat means and a compressor motor of the refrigeration circuit for energizing the refrigeration circuit when a cooling need is sensed by the first thermostat means; and lockout means including first normally open delay relay contacts connected to at least one of the circuit means, first thermostat means or the compressor motor of the refrigeration circuit, said lockout means including switching means connected to the second thermostat means for maintaining the first normally open delay relay contacts open to prevent operation of the refrigeration circuit until the temperature sensed by the second thermostat means exceeds a predetermined threshhold level upon startup of the unit.

6. The apparatus as set forth in claim 5 wherein the lockout means comprises a delay relay and wherein the second thermostat means comprises a temperature sensing element connected to energize the delay relay when a threshold temperature is reached.

7. The apparatus as set forth in claim 6 and further comprising a holding circuit located in parallel with the temperature sensing element for energizing the delay relay and including second normally open delay relay contacts which act to maintain the delay relay energized once the temperature sensing element energizes the delay relay.

8. The apparatus as set forth in claim 7 wherein the first thermostat means comprises a microprocessor switching device connected to an analog type temperature sensing device and wherein the first normally open delay relay contacts are connected between a power source and the microprocessor switching device to prevent power from being supplied to the microprocessor switching device until the temperature sensing element energizes the delay relay.

9. The apparatus as set forth in claim 5 wherein the air conditioning unit includes heating means for supplying heating to the enclosure and further comprising:

heating initiation means for energizing the heating means; and third normally closed delay relay contacts connected to the second thermostat means and the heating initiation means for energizing the heating means when the second thermostat means detects a need therefore.

10. The apparatus as set forth in claim 9 and further comprising:

time delay relay means connected to the initiation means for delaying energization of the second thermostat means for a predetermined time after energization of the initiation means.

* * * * *